2,878,114
Patented Mar. 17, 1959

2,878,114

SMELTING ILMENITE AND TITANIFEROUS ORES

Marvin J. Udy and Murray C. Udy, Niagara Falls, N. Y., assignors to Strategic-Udy Metallurgical and Chemical Processes, Ltd., Hamilton, Ontario, Canada No Drawing. Application April 8, 1957
Serial No. 651,156

10 Claims. (Cl. 75—30)

This invention relates to metallurgy, in general, and has for an object the provision of an improved method or process for the production and recovery of iron and titania. More particularly, the invention contemplates the provision of an improved method or process for the economical treatment of titaniferous iron ores, titaniferous ore concentrates of ilmenite composition, and the like, for the production and recovery of metallic iron and a titanium-enriched slag product containing titanium values in forms which are readily recoverable by chlorination and acid decomposition techniques. The process of the invention is particularly applicable to the treatment of titaniferous iron ores of types which are relatively high in gangue content as, for example, the so-called "titaniferous magnetites," and provides for the recovery of combined titania and iron credits from such ores to an extent which renders possible the economical commercial utilization of these ores for their titania values.

In accordance with present commercial practices, titanium dioxide products are produced directly from naturally occurring minerals such as rutile ores of exceptionally high titanium dioxide contents, or from synthetic materials including beneficiated ores and concentrates, and furnaced slags of the type produced by the selective carbothermic reduction and separation of metallic iron from titaniferous iron ores. In the latter type operation as practiced heretofore, a primary titaniferous iron ore of ilmenite composition, or an ore concentrate, is reduced with carbonaceous reducing agents such as coke, coal, charcoal, etc., in the presence of various fluxing agents including limestone, lime, alumina, and the like, to produce a metallic iron product and a slag rich in titanium dioxide.

A variety of different fluxing practices have been employed heretofore in attempts to maintain fluid, workable slags within smelting operations conducted for the production of slag concentrates high in titanium dioxide. For example, one practice in relatively wide use involves the utilization of basic fluxing agents such as lime, limestone, magnesia, etc., wherein the components of the furnace charge are so adjusted that for approximately each molar equivalent of acidic reacting material other than titanium dioxide within the resulting slag, there is included one molar equivalent of basic fluxing material, plus additional quantities of basic fluxing material in proportion to the molar content of titanium dioxide within the slag. Of course, the use of slags of this type in the manufacture of titanium dioxide products by acid decomposition techniques requires relatively large amounts of sulfuric acid, due in part to consumption of acid by the acid-soluble constituents of the slag other than titania, chiefly the basic fluxes present within the slags. In the same manner, in recovery operations involving chlorination of the slags, the presence of large quantities of basic fluxes are undesirable for the reason that they are readily chlorinatable and result in wasteful consumption of chlorine. Furthermore, it is impossible to effect complete decomposition of these slags with the result that appreciable metallic values are lost in the form of a solid residue remaining from the acid digestion operation conducted for the formation of titanium sulfate. Attempts have been made to mitigate these disadvantages by the beneficiation or concentration of some ores to remove portions of the so-called "undesirable" acidic constituents, such as silica and alumina, prior to the smelting operation, thereby reducing the amount of basic fluxing material that must be added to the furnace to provide workable slags. In theory, it is presumed that the slags, to be digested most economically, must contain as small a proportion as possible of the acidic materials, principally silica and alumina.

In contrast to the foregoing theory, it has also been proposed heretofore (see copending application Serial Number 553,529, filed on December 16, 1955, now U. S. Patent No. 2,830,892, issued Apr. 15, 1958, by coapplicant Marvin J. Udy), to avoid the addition of large amounts of basic fluxing materials by utilizing the alumina content of titaniferous iron ores, supplemented as required for specific ores, as a base with respect to silica present within the ores, or also added thereto as required, to produce a titanium-enriched acid slag which may be readily decomposed by acid leaching with the production and recovery of alumina and titanium oxides as separate products. While such procedures effectively overcome the principal disadvantages inherent in conventional basic fluxing techniques and offer other advantages not obtainable in accordance with current commercial practices, the alumina additions required for proper fluxing of most typical titaniferous iron ores and the subsequent recovery operations incidental to regeneration of this flux component, are limiting factors in the process.

Apart from the foregoing problems presented in connection with the after-processing of conventional titanium dioxide slags, a more important consideration presently confronting industry is that presented in connection with the actual furnacing of the slags due to their highly refractory natures. Thus, while basic fluxing practices provide satisfactory fluid slags so long as they are maintained hot, the slags tend to chill rapidly and become highly viscous, thereby rendering it virtually impossible to effect complete settling and separation of metallic iron from the slags. The high-temperature slags characteristic of such operations are extremely wearing on refractory furnace linings and furnace roofs, and necessitate relatively frequent replacement of these items. Furthermore, in order to preserve the slags produced in accordance with heretofore customary practices in a fluid and workable state, extreme care must be exercised to maintain the titanium content of the slags within the dioxide form, i. e., to avoid over-reduction of the charge and the production of lower oxide forms of titanium. The formation of the sesquioxide ($Ti_2O_3$), for example, by reduction of titanium dioxide due to the action of carbonaceous material added for iron removal, causes the slags to become viscous and gummy, whereas reduction of any appreciable portion of the dioxide to the monoxide form (TiO) renders the slags so highly refractory that they cannot be tapped from the furnace chamber. As a sum result of these difficulties, it is not at all uncommon to encounter so-called "commercial" titanium dioxide-enriched furnaced slags having residual iron contents within the range of five to twelve percent by weight (5–12 wt.-percent).

The present invention is based, in part, on our discovery that substantially all of the disadvantages customarily encountered in present practices for the processing of titaniferous iron ores can be overcome, and significant advantages can be obtained, by utilizing silica, exclusively, as the fluxing material for the formation of carbothermic reduction burdens containing such ores. Thus, we have found that the controlled addition of predetermined amounts of silica to titaniferous iron ore furnace burdens results in the production of slags of excellent workability which do not chill readily, and from which iron oxides present within the original ore can be reduced and separated to ultimate residual values of less than one percent (1.0%). Furthermore, it is found that the synthetic titanium silicate slag systems of the invention retain their desirable fluidity and general workability in spite of the fact that the reduction operation is conducted in the presence of excess carbonaceous reducing material for reduction of substantial quantities of titanium dioxide to lower oxides of titanium, such as $Ti_2O_3$ or TiO, or even solutions of the monoxide and titanium carbide, varying from thirty to sixty percent (30–60%) or more of the carbide. The resulting iron-free titanium oxide-enriched slags are found to be substantially completely digestible or soluble within conventional sulfuric acid leaching solutions, and those slags which are reduced to divalent forms of titanium (Ti— C and O) can be chlorinated directly to titanium tetrachloride to the extent of fifty percent (50%) or more of their titanium content, even in the absence of any added carbonaceous material. Thus, by carefully adjusting the additions of fluxing material and carefully controlling the amount of reducing agent added to an ore or concentrate undergoing smelting for iron removal, the percentage of divalent titanium (TiC and TiO) present within the resulting slag may approach one-hundred percent of the total titanium content of the ore or concentrate. In this connection, it is found that the lower grade titaniferous iron ores of high alumina and silica content are particularly amenable to complete conversion of their titanium content to the divalent states.

The process of the invention is applicable for use in connection with substantially all known types of titaniferous iron ores, including both high- and low-grade materials. In this connection, it should be noted that some ores of the general class described, notably the ilmenites, contain titania in such magnitude that one can obtain titania-enriched slags of seventy-two percent (72%) or higher titania content solely by elimination of iron. On the other hand, in other types of ores, notably the magnetite formations (approximately 47% Fe and 12–20 $TiO_2$), the gangue materials present within the ores occur in such quantity and composition that the titanium content of the ores cannot be enriched, through iron removal, above approximately fifty-seven percent (57%). While these latter ores are not economically suitable for commercial titania-recovery processing in accordance with current industrial practices, the relatively high-grade iron product recoverable therefrom in accordance with the process of the present invention and the additional credit obtained upon sale of this product, render such ores entirely practical for commercial utilization.

In connection with the unique fluxing practices of the invention, it should be noted that relatively few titanium silicates of natural occurrence have been reported heretofore, and, as might be expected from this fact, it is not possible under ordinary conditions to effect dilution of a titaniferous iron ore with silica in excess of approximately eight to ten percent (8–10%). Upon smelting a premixed reduction burden containing silica in excess of this range, or upon attempting to add increased amounts of silica to a reduction burden undergoing smelting, it is found that the excessive silica is discharged from the furnace chamber in the form of long, fibre-like, air-borne streamers. We have found, however, that the addition of silica flux to a titaniferous iron ore can be effected in concentrations up to thirty-five percent (35%) or more, provided the silica in excess of that which will readily combine with the titania under normal conditions, is forced into the titania slag at a temperature of about 1450° C., or higher.

In practicing the process of the invention, we prefer to flux the ilmenites and titaniferous iron ores with silica such as to provide, in combination with silica naturally present within the ores, an amount within the range 0.50 to 1.5 parts by weight (silica) to each part by weight titania present within the ores. Preferably, for the reasons noted above, the silica flux is added to the reduction burden after it has been melted or heated to a temperature of the order of 1450° C., or higher. Alternatively, a portion of the flux required to satisfy the foregoing silica-titania ratio can be added to the preliminary furnace charge, with the remainder being added after the charge has been heated to a molten state. In either event, fluxing and melting of a reduction burden is effected prior to the addition of any carbonaceous reducing material in accordance with the carbothermic reduction technique described and claimed in copending U. S. application Serial Number 643,524, filed on March 4, 1957, by co-inventor, Marvin J. Udy. Thus, it has been found that substantial economies can be realized by withholding the reducing agent until the reduction burden has been established at its optimum smelting temperature. In this manner, the eventual addition of the carbonaceous reducing material results in an extremely rapid reduction reaction with substantially complete separation and settling of entrained metallic iron from the molten slag.

We have found it to be beneficial to employ the ore and silica in finely-divided forms, and, in actual practice, the ore is crushed, preliminarily, to approximately 8 mesh size or smaller. The silica employed for fluxing purposes can be of any conventional grade including quartz or quartzite. Advantageously, we may employ a non-titaniferous magnetite ore containing silica as its chief gangue material, as the fluxing agent, thereby increasing the iron content of the furnace burden while utilizing an inexpensive and plentiful source of silica.

The components of the furnace charge are so proportioned as to provide reducing agent either in an amount just sufficient for the selective reduction to the metallic state of all of the iron oxide present in the charge, with retention of the titanium values within the resulting slag principally in the form of titanium dioxide, or an excess of carbonaceous reducing agent may be charged to the molten furnace burden and total reduction of iron effected with the simultaneous reduction, to any extent desired, of the titanium dioxide content of the charge to lower oxides of titanium, such as $Ti_2O_3$ and TiO. Alternatively, over-reduction can be practiced to such an extent as to provide a mixture of divalent titanium monoxide and titanium carbide, exclusively. In actual practice, the degree of reduction effected with respect to the titania content of any furnace burden is regulated in accordance with the particular method of treatment to be used in ultimately processing the resulting slags for recovery of their titanium values. Thus, provided the slags are to be treated by acid leaching, we prefer to effect reduction of as large a quantity as possible of the titanium dioxide to lower oxides while avoiding the formation of titanium carbide. On the other hand, if the slags are to be chlorinated for the formation of titanium tetrachloride ($TiCl_4$), we prefer to practice reduction for the formation of titanium carbide to the greatest extent possible. It is found that such slags can be chlorinated directly, without chlorinating the silica or alumina present therein, for the recovery of substantially all of the titanium content of the slag in the form of titanium tetrachloride. Thus, by adding a carbonaceous reducing agent to such slags in proportion to the titanium oxide content thereof, substantially complete recovery of the titanium can be effected by chlorination.

In treating essentially iron-free titania slags of the invention by acid digestion, we prefer to employ the techniques described and claimed in the aforementioned copending application Serial No. 553,529, effecting recovery of both the titania and alumina values present within the slags. In general, this involves crushing of the slag in any suitable manner to approximately 100 mesh size followed by decomposition of the same by digesting at boiling temperatures with sulfuric acid of forty to sixty percent (40–60%) concentration. In lieu of crushing, we have found that the slags may be decomposed (or chlorinated) directly, provided they are granulated with water upon removal from the smelting furnace. In order to facilitate filtering, the digestion operation is conducted at a temperature of at least 290° C. to dehydrate gelatinous silica. The sulfuric acid is employed in theoretical quantities plus about ten percent (10%) excess.

Following complete digestion, the hot solution is filtered, washed with sulfuric acid of approximately fifty to sixty percent (50–60%) concentration, and thereafter washed with water. The residue, largely silica, and including impurities, can be discarded or recycled for use as flux in the iron removal operations. The filtered solution containing titanium sulfate and aluminum sulfate is evaporated to 60% $H_2SO_4$ and allowed to cool to room temperature (20–25° C.) at which point the solubility of aluminum sulfate in 60% $H_2SO_4$ is very low, and the $Al_2(SO_4)_3$ crystallizes out and is recovered by filtering or centrifuging. The aluminum sulfate may be washed and marketed as such, or converted to alumina in accordance with the process techniques described in detail within the copending application.

The 60% sulfuric acid solution containing the titanous sulfate may be diluted with water and boiled and the sulfate hydrolyzed to yield titanium hydroxide [$Ti(OH)_3$] which may then be calcined to produce titanium dioxide. The weak sulfuric acid remaining in solution in this type of treatment can be concentrated by evaporation and then recycled to the process. In lieu of this recovery method, by evaporating the 60% sulfuric acid solution to fumes, the titanous sulfate can be recrystallized or salted out and separated by filtering or centrifuging, and thereafter decomposed to titanium dioxide and $SO_2+SO_3$ with the bulk of the strong acid being regenerated and returned to the process in accordance with the technique described and claimed in copending application Serial No. 576,151 of Marvin J. Udy, filed on April 4, 1956, now abandoned, and entitled "Process and Apparatus for the Treatment of Metallic Sulfates."

As will be readily appreciated, the unique slags of the invention may be processed by any other conventional method for recovery of their titanium values. In point of fact, the degree of control provided by the unique fluxing and reduction permits the production of slag products which can be adjusted to optimum composition for treatment by virtually all known processing techniques. By providing for the substantial complete reduction and removal of iron from the slags, coupled with controlled reduction of the titania content without complications in furnace operations, the process of the invention offers a practical and economical solution to the numerous problems presently confronting this industry.

It should be noted that the process of the invention may be practiced in conjunction with all standard types of furnace apparatus, including electric furnaces as well as oil- and gas-fired furnaces, among others. In actual practice for iron removal, however, we prefer to operate within electric arc furnaces of the design and operational characteristics described and claimed in copending application Serial Number 553,529 of Marvin J. Udy, filed on December 16, 1955.

It is believed that the invention may be best understood by reference to the following specific examples illustrating the foregoing principles and procedures as applied to the treatment of a titaniferous iron ore of the following analysis:

ORE ANALYSIS

| | Percent |
|---|---|
| $TiO_2$ | 17.15 |
| $Fe_2O_3$ | 69.51 |
| $Al_2O_3$ | 9.62 |
| $SiO_2$ | 2.59 |
| CaO | 0.42 |
| MgO | 1.41 |

*Examples*

Two separate charges were prepared with ore of the foregoing analysis and then melted within a 100 kva. arc electric furnace designed and operated in accordance with the teachings of the aforementioned copending application Serial Number 553,645 of Marvin J. Udy, filed on December 16, 1955. The additions of silica flux and coke of 85% fixed carbon content to the molten (1450° C.) charges within the furnace were adjusted in accordance with the following schedule. In both instances, the slags were completely fluid and workable during furnacing.

| Example No. | Furnace Charges | | |
|---|---|---|---|
| | Ore (lbs.) | $SiO_2$ (lbs.) | C (lbs.) |
| I | 200 | 30 | 32 |
| II | 150 | 62 | 28 |

The separate slags recovered from the electric furnace analyzed as follows:

| Example | I | II |
|---|---|---|
| $TiO_2$ (percent) | 37.7 | 45.8 |
| Fe (percent) | 1.9 | 1.6 |
| $SiO_2$ (percent) | 28.4 | 41.1 |
| $Al_2O_3$ (percent) | 20.0 | 16.3 |
| CaO (percent) | Nil | Nil |
| MgO (percent) | 2.4 | 1.9 |

Chlorination tests conducted with the foregoing slags at 800° C. in the absence of any added reducing agent yielded the following results:

| Example No. | Percent Chlorination (based on total Ti) |
|---|---|
| I | 14.1 |
| II | 48.8 |

Five other slags prepared in accordance with the principles of the invention were sampled and subjected to petrographic analysis to determine the amount of titanium present in the various valency states within the slags. The following data illustrate the results of these tests:

| Slag Designation | A | B | C | D | E |
|---|---|---|---|---|---|
| Percent Divalent titanium (as Ti) | 1.3 | 1.0 | 6.0 | 4.5 | 5.3 |
| Percent Trivalent Titanium (as Ti) | 11.3 | 6.2 | 6.0 | 11.1 | 11.8 |
| Percent Tetravalent titanium (as Ti) | 7.9 | 10.5 | 7.8 | 8.6 | 9.0 |
| Percent Total titanium (as $TiO_2$) | 34.2 | 29.5 | 33.0 | 40.0 | 43.5 |

The following tabulated data illustrate the percentages of the total titanium in the three different valence states within the above slag samples:

| Slag Designation | A | B | C | D | E |
| --- | --- | --- | --- | --- | --- |
| Percent of Total Ti: | | | | | |
| Divalent | 6.34 | 5.65 | 30.30 | 18.59 | 20.31 |
| Trivalent | 55.12 | 35.02 | 30.30 | 45.87 | 45.87 |
| Tetravalent | 38.54 | 59.31 | 39.4 | 35.54 | 35.54 |

A specimen of each of the above slags was tested for decomposition, and it was found that in all instances the slags were completely digestible with sulfuric acid of sixty percent (60%) concentration.

Of course, as will be readily apparent, the unique fluxing practices of the invention are equally applicable for use in reduction operations employing non-carbonaceous reducing agents such as silicon, etc.

Having thus described the subject matter of our invention, what it is desired to secure by Letters Patent is:

1. In a process for the treatment of a metallurgical charge comprising at least one material selected from the group consisting of ilmenites, titaniferous iron ores and concentrates of the same, involving the selective reduction and recovery of metallic iron and the production of an essentially iron-free titania slag therefrom, the improvement that comprises fluxing said charge exclusively with silica in the production of the reduction burden.

2. In a process for the treatment of a metallurgical charge comprising at least one material selected from the group consisting of ilmenites, titaniferous iron ores and concentrates of the same, involving the carbothermic reduction and recovery of metallic iron and the production of an essentially iron-free titania slag therefrom, the improvement that comprises fluxing said charge solely with silica in the production of the carbothermic reduction burden.

3. In a process for the treatment of a metallurgical charge comprising at least one material selected from the group consisting of ilmenites, titaniferous iron ores and concentrates of the same, involving the selective reduction and recovery of metallic iron and the production of an essentially iron-free titania slag therefrom, the improvement that comprises fluxing said charge for the production of the reduction burden with silica in an amount sufficient to provide, in combination with any silica naturally present within the charge, from 0.5 to 1.5 parts by weight silica to each part by weight of titania contained therein.

4. In a process for the treatment of a metallurgical charge comprising at least one material selected from the group consisting of ilmenites, titaniferous iron ores and concentrates of the same, involving the carbothermic reduction and recovery of metallic iron and the production of an essentially iron-free titania slag therefrom, the improvement that comprises fluxing said charge for the production of the carbothermic reduction burden exclusively with silica in an amount sufficient to provide, in combination with any silica naturally present within the charge, from 0.5 to 1.5 parts by weight silica to each part by weight of titania contained therein.

5. In a process for the treatment of a metallurgical charge comprising at least one material selected from the group consisting of ilmenites, titaniferous iron ores and concentrates of the same, involving the carbothermic reduction and recovery of metallic iron and the production of an essentially iron-free titania slag therefrom, the improvement that comprises fluxing said charge for the production of the carbothermic reduction burden exclusively with silica in the form of a non-titaniferous iron ore containing silica as the chief gangue constituent thereof such as to provide silica in an amount within the range 0.5 to 1.5 parts by weight, inclusive of silica naturally present within the charge, to each part by weight of titania contained therein.

6. In a process for the treatment of a metallurgical charge comprising at least one material selected from the group consisting of ilmenites, titaniferous iron ores and concentrates of the same involving the carbothermic reduction and recovery of metallic iron and the production of an essentially iron-free titania slag therefrom, the improvements that comprise fluxing said charge solely with silica in the production of the carbothermic reduction burden, and subjecting the charge and admixed silica flux to reduction smelting in the presence of sufficient carbonaceous reducing material to effect reduction to the metallic state of substantially all of the iron oxide contained therein and reduction of a substantial portion of the titania content of said charge to lower oxide forms of titanium.

7. In a process for the treatment of a metallurgical charge comprising at least one material selected from the group consisting of ilmenites, titaniferous iron ores and concentrates of the same, involving the carbothermic reduction and recovery of metallic iron and the production of an essentially iron-free titania slag therefrom, the improvements that comprise fluxing said charge solely with silica in the production of the carbothermic reduction burden, and subjecting the charge and admixed silica to reduction smelting in the presence of a carbonaceous reducing material in an amount sufficient to effect reduction to the metallic state of substantially all of the iron oxide contained therein and reduction of at least a portion of the titania content of said charge to divalent compounds of titanium selected from the group consisting of titanium monoxide and titanium carbide.

8. In a process for the treatment of a metallurgical charge comprising at least one material selected from the group consisting of ilmenites, titaniferous iron ores and concentrates of the same, involving the carbothermic reduction and recovery of metallic iron and the production of an essentially iron-free titania slag therefrom, the improvements that comprise fluxing said charge for the production of the carbothermic reduction burden exclusively with silica in an amount sufficient to provide, in combination with any silica naturally present within the charge, from 0.5 to 1.5 parts by weight silica to each part by weight titania contained therein, and subjecting the charge and admixed silica flux to reduction smelting in the presence of a carbonaceous reducing material in an amount sufficient to effect reduction to the metallic state of substantially all of the iron oxide contained therein and reduction of a substantial portion of the titania content of said charge to lower oxide forms of titanium.

9. In a process for the treatment of a metallurgical charge comprising at least one material selected from the group consisting of ilmenites, titaniferous iron ores and concentrates of the same, involving the carbothermic reduction and recovery of metallic iron and the production of an essentially iron-free titania slag therefrom, the improvements that comprise fluxing said charge for the production of the carbothermic reduction burden exclusively with silica in an amount sufficient to provide, in combination with any silica naturally present within the charge, from 0.5 to 1.5 parts by weight silica to each part by weight titania contained therein, and subjecting the charge and admixed silica flux to reduction smelting in the presence of a carbonaceous reducing material in an amount sufficient to effect reduction to the metallic state of substantially all of the iron oxide contained therein and reduction of substantially all of the titania content of said charge to divalent compounds of titanium selected from the group consisting of titanium monoxide and titanium carbide.

10. Process for the treatment of a metallurgical charge comprising at least one material selected from the group consisting of ilmenites, titaniferous iron ores and concentrates of the same that comprises, forming a carbothermic reduction burden by admixing said charge with silica in an amount within the range 0.5 to 1.5 parts by weight silica, inclusive of silica naturally present within said charge, to each part by weight titania contained therein, subjecting said charge and admixed silica to reduction smelting in the presence of a carbonaceous reducing material in an amount at least sufficient to effect reduction to the metallic state of substantially all of the iron oxide contained therein with the production of metallic iron and an essentially iron-free titania slag containing substantially all of the titanium originally present within said charge, and separating and recovering said metallic iron from said slag product.

References Cited in the file of this patent

UNITED STATES PATENTS

| | | |
|---|---|---|
| 930,344 | Borchers | Aug. 10, 1909 |
| 1,743,885 | Gardner et al. | Jan. 14, 1930 |
| 2,378,675 | Agnew et al. | June 19, 1945 |
| 2,537,229 | McLaren | Jan. 9, 1951 |
| 2,680,681 | Armant et al. | June 8, 1954 |